United States Patent
Wakeyama et al.

(10) Patent No.: US 9,282,182 B2
(45) Date of Patent: Mar. 8, 2016

(54) MONITORING SYSTEM

(71) Applicant: Panasonic Intellectual Property Management Co., Ltd., Osaka (JP)

(72) Inventors: Daisuke Wakeyama, Fukuoka (JP); Mitsuru Kawamura, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/665,867

(22) Filed: Mar. 23, 2015

(65) Prior Publication Data
US 2015/0296077 A1  Oct. 15, 2015

(30) Foreign Application Priority Data
Apr. 9, 2014  (JP) .................................. 2014-080332

(51) Int. Cl.
| | |
|---|---|
| H04M 3/42 | (2006.01) |
| H04M 3/02 | (2006.01) |
| G08B 13/196 | (2006.01) |
| H04N 7/18 | (2006.01) |
| H04L 29/06 | (2006.01) |

(52) U.S. Cl.
CPC ........... *H04M 3/02* (2013.01); *G08B 13/19684* (2013.01); *H04L 65/40* (2013.01); *H04N 7/186* (2013.01); *H04M 3/42* (2013.01)

(58) Field of Classification Search
CPC ........................................................ H04M 3/42
USPC ...................................................... 455/414.1
See application file for complete search history.

(56) References Cited

U.S. PATENT DOCUMENTS

| | | | | |
|---|---|---|---|---|
| 6,166,627 A | * | 12/2000 | Reeley .................. | B60R 25/102 340/426.18 |
| 7,428,002 B2 | * | 9/2008 | Monroe ........... | G08B 13/19634 348/143 |
| 8,780,201 B1 | | 7/2014 | Scalisi et al. | |
| 2002/0194527 A1 | * | 12/2002 | Murai .................... | G01D 4/002 714/6.31 |
| 2004/0024876 A1 | * | 2/2004 | Ito .......................... | H04N 7/183 709/226 |
| 2004/0155757 A1 | * | 8/2004 | Litwin, Jr. ........... | H04L 12/2602 340/538 |
| 2004/0180664 A1 | * | 9/2004 | Numminen ............. | H04W 8/12 455/445 |
| 2008/0132199 A1 | * | 6/2008 | Hirata .................. | G08B 25/016 455/404.2 |
| 2008/0212746 A1 | * | 9/2008 | Gupta ................. | G06F 19/3418 379/38 |

(Continued)

FOREIGN PATENT DOCUMENTS

| | | |
|---|---|---|
| JP | 11-004480 A | 1/1999 |
| JP | 2000-099862 A | 4/2000 |

(Continued)

OTHER PUBLICATIONS

International Search Report and Written Opinion mailed Jul. 17, 2015, for corresponding International Application No. PCT/JP2015/001295, 22 pages.

*Primary Examiner* — Santiago Garcia
(74) *Attorney, Agent, or Firm* — Seed IP Law Group PLLC

(57) ABSTRACT

A master device sends image data transmitted from a monitoring camera to a mobile phone terminal, the mobile phone terminal sends a request signal for starting a call to the monitoring camera when receiving an operation on a predetermined icon displayed on a display/input unit in a state in which the image data is displayed on the display/input unit, and the master device transmits the request signal for starting the call to the monitoring camera from the mobile phone terminal.

7 Claims, 13 Drawing Sheets

(56) References Cited

U.S. PATENT DOCUMENTS

| | | | | |
|---|---|---|---|---|
| 2008/0284862 A1* | 11/2008 | Kogane | ............... | H04N 5/23203 348/211.8 |
| 2009/0167862 A1* | 7/2009 | Jentoft | ............. | G08B 13/19641 348/143 |
| 2009/0193217 A1* | 7/2009 | Korecki | ............... | G06Q 10/087 711/170 |
| 2010/0195810 A1* | 8/2010 | Mota | ...................... | H04N 7/186 379/167.12 |
| 2012/0282974 A1* | 11/2012 | Green | ................ | G08B 13/19689 455/550.1 |
| 2013/0057695 A1 | 3/2013 | Huisking | | |
| 2014/0098247 A1* | 4/2014 | Rao | ......................... | H04W 4/20 348/207.1 |
| 2014/0167928 A1* | 6/2014 | Burd | ................ | G06F 17/30893 340/12.5 |
| 2014/0201072 A1* | 7/2014 | Reeser | ................. | G08B 25/001 705/40 |
| 2014/0375801 A1* | 12/2014 | Park | ....................... | H04N 7/183 348/143 |
| 2015/0250021 A1* | 9/2015 | Stice | .................... | G06F 11/3051 710/16 |
| 2015/0294542 A1* | 10/2015 | Wada | .................... | G08B 13/196 348/152 |
| 2015/0296165 A1* | 10/2015 | Sato | ....................... | G08B 25/08 348/158 |

FOREIGN PATENT DOCUMENTS

| | | |
|---|---|---|
| JP | 2002-290577 A | 10/2002 |
| JP | 2002-330230 A | 11/2002 |
| JP | 2004-200809 A | 7/2004 |
| JP | 2004-328059 A | 11/2004 |
| JP | 2011-155416 A | 8/2011 |

* cited by examiner

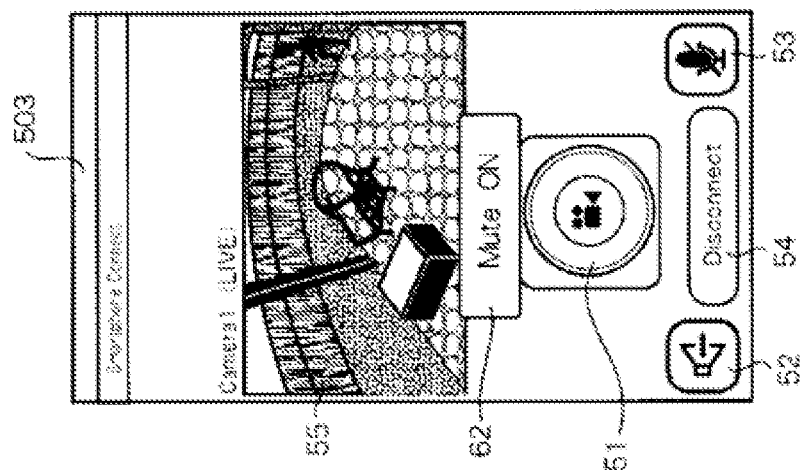
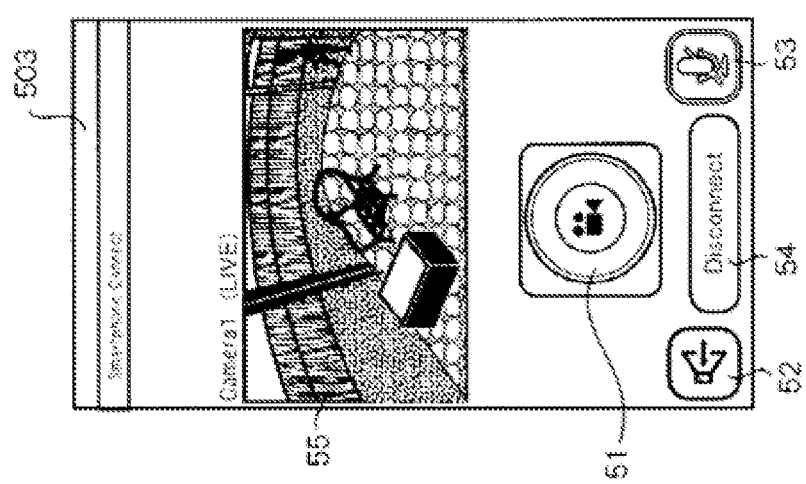
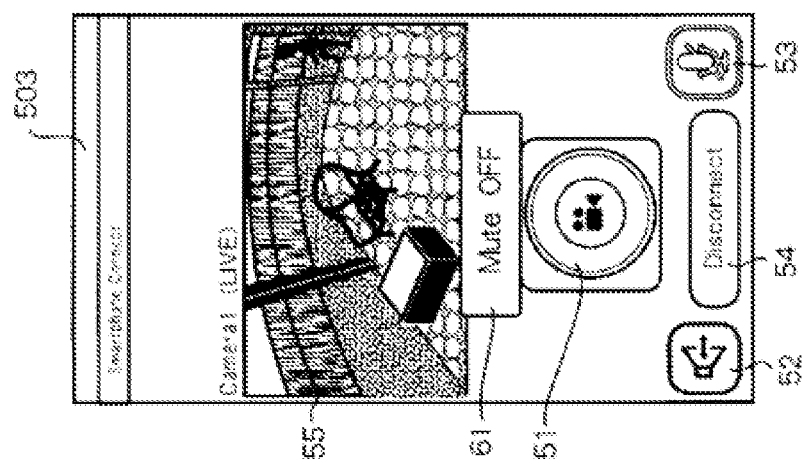

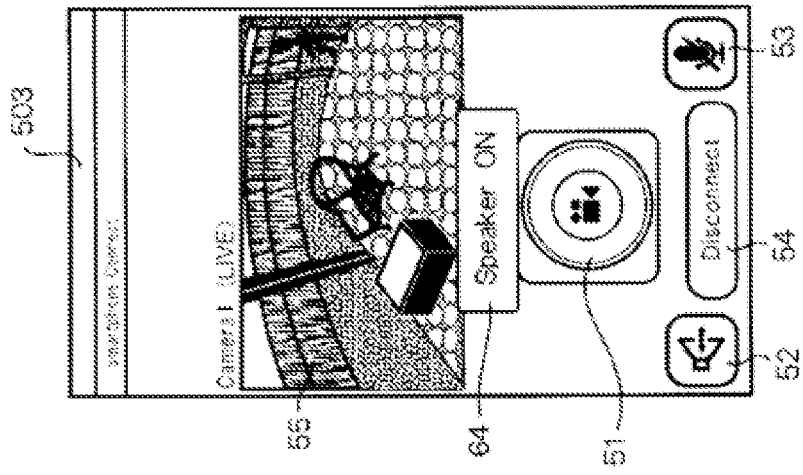
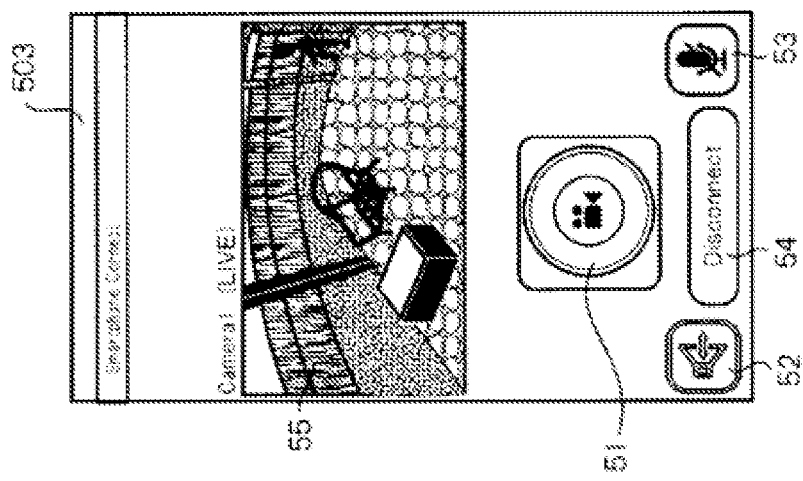
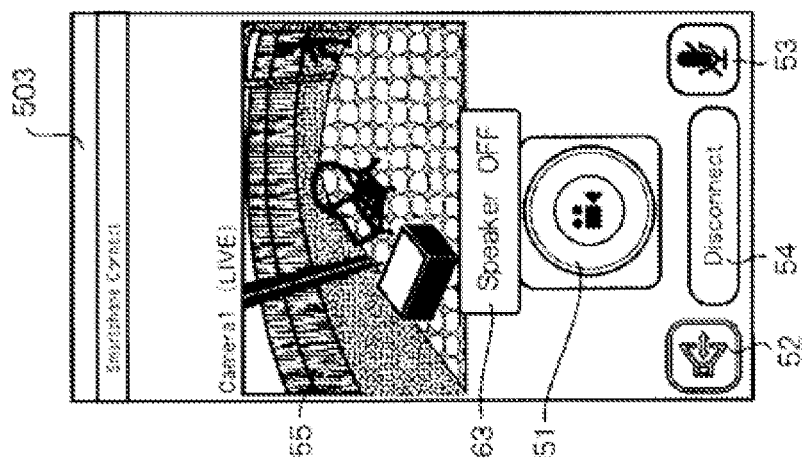

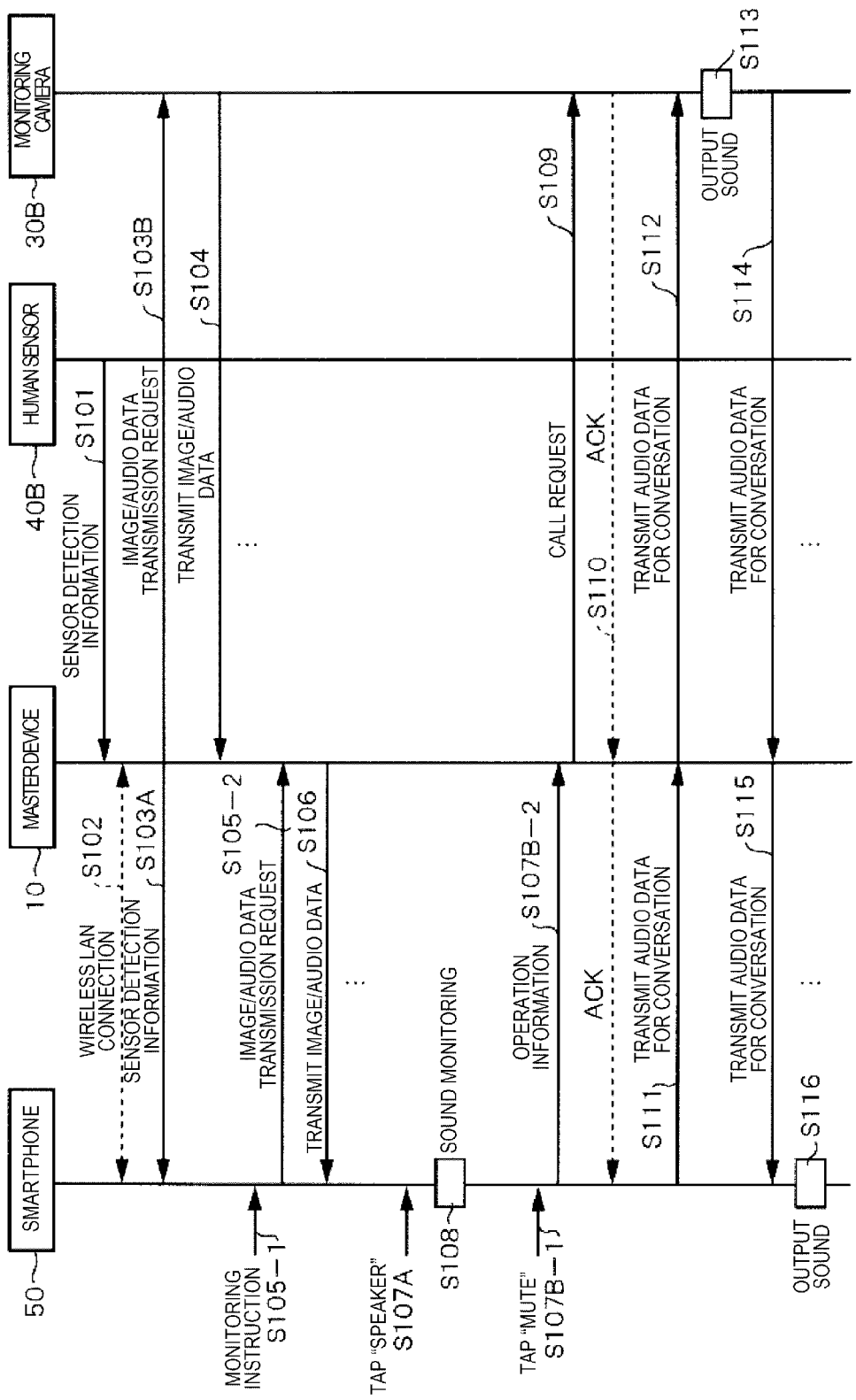

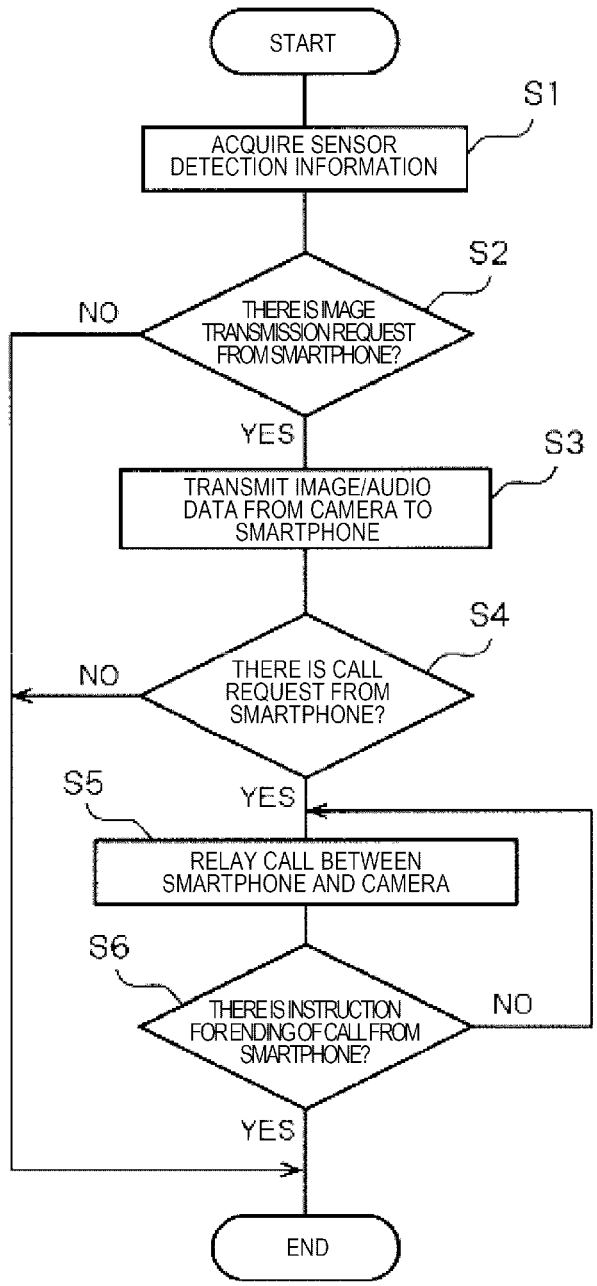

MONITORING SYSTEM

BACKGROUND OF THE INVENTION

1. Field of the Invention

The present invention relates to a monitoring system which performs data input and output to and from a camera.

2. Description of the Related Art

In the related art, as an example of a communication system which performs data input and output to and from a camera, there is a monitoring camera system which monitors an intruder who enters a house lot. A monitoring camera system disclosed in Japanese Patent Unexamined Publication No. 2000-99862 includes a home server which can record video and sound, an infrared sensor, a video camera, and a microphone. In a case where the infrared sensor detects an intruder, the home server records a video of the intruder and also records sound of the intruder by using the video camera and the microphone.

However, in the above-described patent document, in a case where the sensor detects the intruder, image data indicating a video captured by the video camera and audio data of sound collected by the microphone are just recorded by the home server.

A home dweller may recognize the presence of an intruder in circumstances in which the dweller observes the home server at all times, but the dweller is not continuously able to recognize the intruder if the dweller is away from a location (for example, a home study) where image data or audio data stored in the home server can be checked. The dweller reproduces the recorded image data or audio data and thus recognizes the presence of the intruder for the first time. For this reason, the dweller cannot converse with the intruder, such as directly listening to what is wanted from the intruder. In a case where the dweller is out, it is difficult to directly converse with the intruder from a place being visited.

SUMMARY OF THE INVENTION

In order to solve the problems of the related art, an object of the present invention is to provide a portable terminal and a communication system capable of improving a user's convenience by performing a call between a camera and a portable terminal in a case where a target is detected by a sensor.

According to the present invention, there is provided a monitoring system including a sensor; a monitoring camera that includes an image capturing unit, and has a call function; a master device that communicates with the monitoring camera, and is connected to a fixed telephone network so as to perform calls to other fixed telephones; and a mobile phone terminal that includes a display/input unit, performs wireless communication with the master device, and is connected to other mobile phones via a mobile phone network, in which, when the sensor detects a target, a detection signal is sent to the master device, in which the master device sends a signal for instructing the monitoring camera registered in correlation with the sensor to transmit image data, in which, when an operation of giving an instruction for displaying an image is received, the mobile phone terminal sends information regarding the operation to the master device, in which the master device sends the image data which is transmitted from the monitoring camera, to the mobile phone terminal according to the information regarding the operation, in which the mobile phone terminal sends a request signal for starting a call to the monitoring camera when receiving an operation on a predetermined icon displayed on the display/input unit in a state in which the image data sent from the monitoring camera is displayed on the display/input unit, and in which the master device transmits the request signal for starting a call from the mobile phone terminal, to the monitoring camera.

According to the present invention, it is possible to improve a user's convenience by performing a call between a camera and a portable terminal in a case where a target is detected by a sensor. Consequently, in a case where the present invention is applied to a monitoring camera system, a dweller can converse with an intruder, such as directly listening to what is wanted from the intruder.

BRIEF DESCRIPTION OF DRAWINGS

FIG. 9A is a diagram illustrating transition of the screen of the smartphone when a hands-free call is performed;

FIG. 9B is a diagram illustrating transition of the screen of the smartphone when a hands-free call is performed;

FIG. 9C is a diagram illustrating transition of the screen of the smartphone when a hands-free call is performed;

FIG. 11A is a diagram illustrating transition of the screen of the smartphone when telephone monitoring is performed;

FIG. 11B is a diagram illustrating transition of the screen of the smartphone when telephone monitoring is performed;

FIG. 11C is a diagram illustrating transition of the screen of the smartphone when telephone monitoring is performed;

FIG. 12 is a sequence diagram illustrating a flow of an operation of the monitoring camera system; and FIG. 13 is a flowchart illustrating an operation procedure of the master device.

DETAILED DESCRIPTION OF THE PREFERRED EMBODIMENT

With reference to the drawings, a description will be made of an embodiment (hereinafter, referred to as "the present embodiment") of a monitoring camera system related to the present invention.

Figure 1:
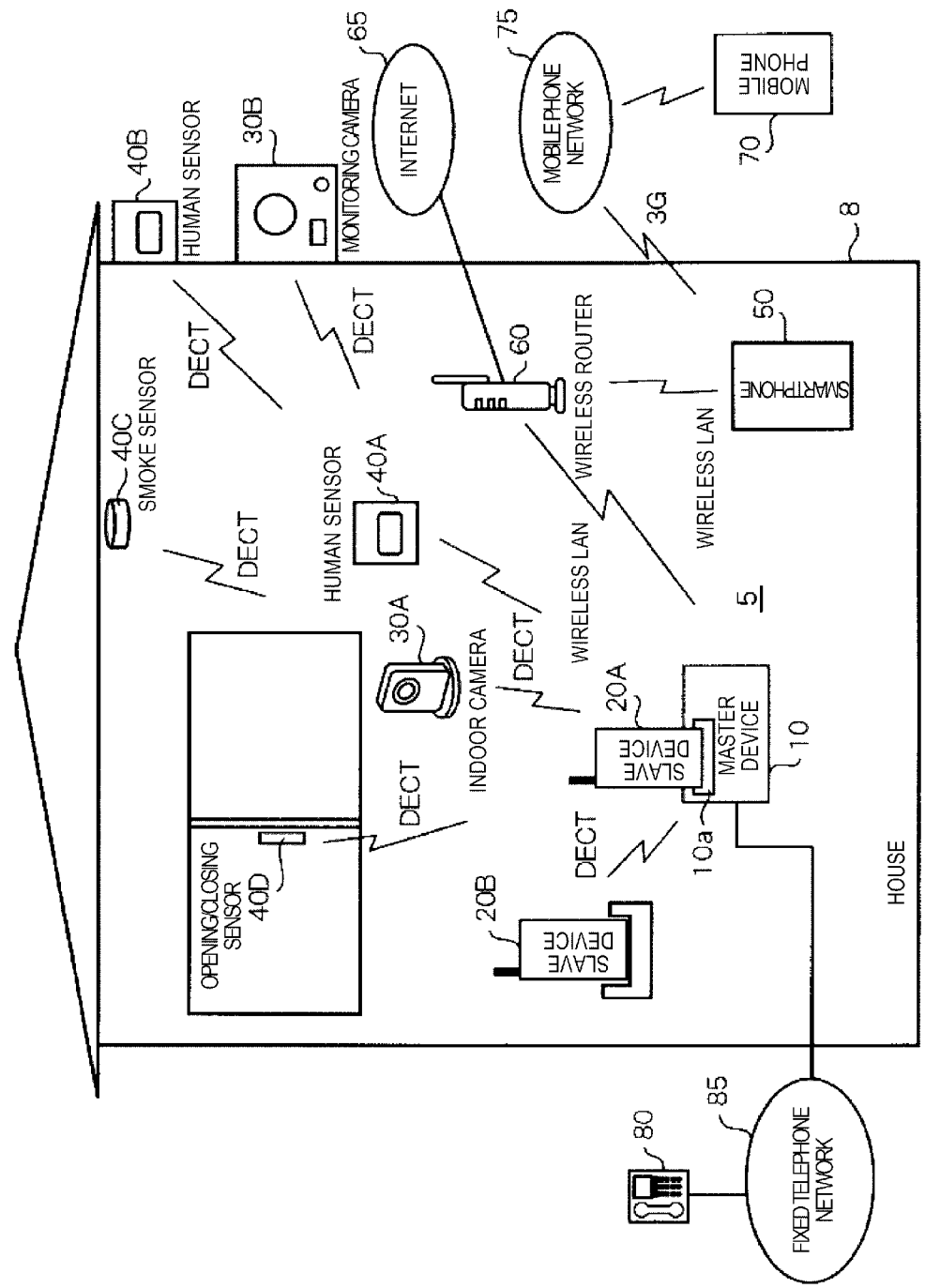
FIG. 1 is a diagram illustrating a system configuration of a monitoring camera system of the present embodiment.

FIG. 1 is a diagram illustrating a system configuration of monitoring camera system 5 of the present embodiment. Monitoring camera system 5 is mainly provided in house 8, and includes master device 10, two slave devices 20A and 20B, two cameras 30 (specifically, indoor camera 30A and monitoring camera 30B), various sensors 40 (specifically, human sensors 40A and 40B, smoke sensor 40C, and opening/closing sensor 40D), smartphone 50, and wireless router 60. A configuration of monitoring camera system 5 is only an example and may be modified in various aspects.

Master device (gateway) 10 is a control device which controls the entire operation of monitoring camera system 5, and is connected to the slave devices, the cameras, the sensors, and the like in a communicable manner by using a communication method such as digital enhanced cordless telecommunications (DECT). Master device 10 is connected to the Internet 65 (network) via wireless router 60 using a wireless LAN. Master device 10 is connected to fixed telephone network 85 in a wired manner and can perform a call to fixed telephone 80. Master device 10 has a function of charging slave device 20A which is inserted into insertion port 10a.

Slave devices 20A and 20B are connected to master device 10 in the DECT communication method and can perform a call to master device 10. Particularly, in a case where two slave devices 20A and 20B are not required to be differentiated from each other, the slave devices are collectively referred to as slave device 20.

Various sensors 40 (specifically, human sensors 40A and 40B, smoke sensor 40C, and opening/closing sensor 40D) are connected to master device 10 in the DECT communication method. Herein, as sensors, opening/closing sensor 40D which detects opening and closing of a window, smoke sensor 40C which detects smoke, and human sensors 40A and 40B which detect a person with infrared rays are used. Particularly, in a case where the sensors are not required to be differentiated from each other, the sensors are collectively referred to as sensor 40. As will be described later, infrared sensor 313 (refer to FIG. 4) built into camera 30 is also used as a human sensor.

The two cameras (specifically, indoor camera 30A and monitoring camera 30B) have a call function and are connected to master device 10 in the DECT communication method. Herein, as cameras, monitoring camera 30B which captures an image of an outdoor environment, and indoor camera 30A which captures an image of house 8, are used. Particularly, in a case where the cameras are not required to be differentiated from each other, the cameras are collectively referred to as camera 30.

Smartphone 50 is connected to master device 10 via wireless router 60 using a wireless LAN, and is connected to mobile phone 70 or other smartphones via mobile phone network 75 using a communication method such as the third generation (3G) method.

Figure 2:
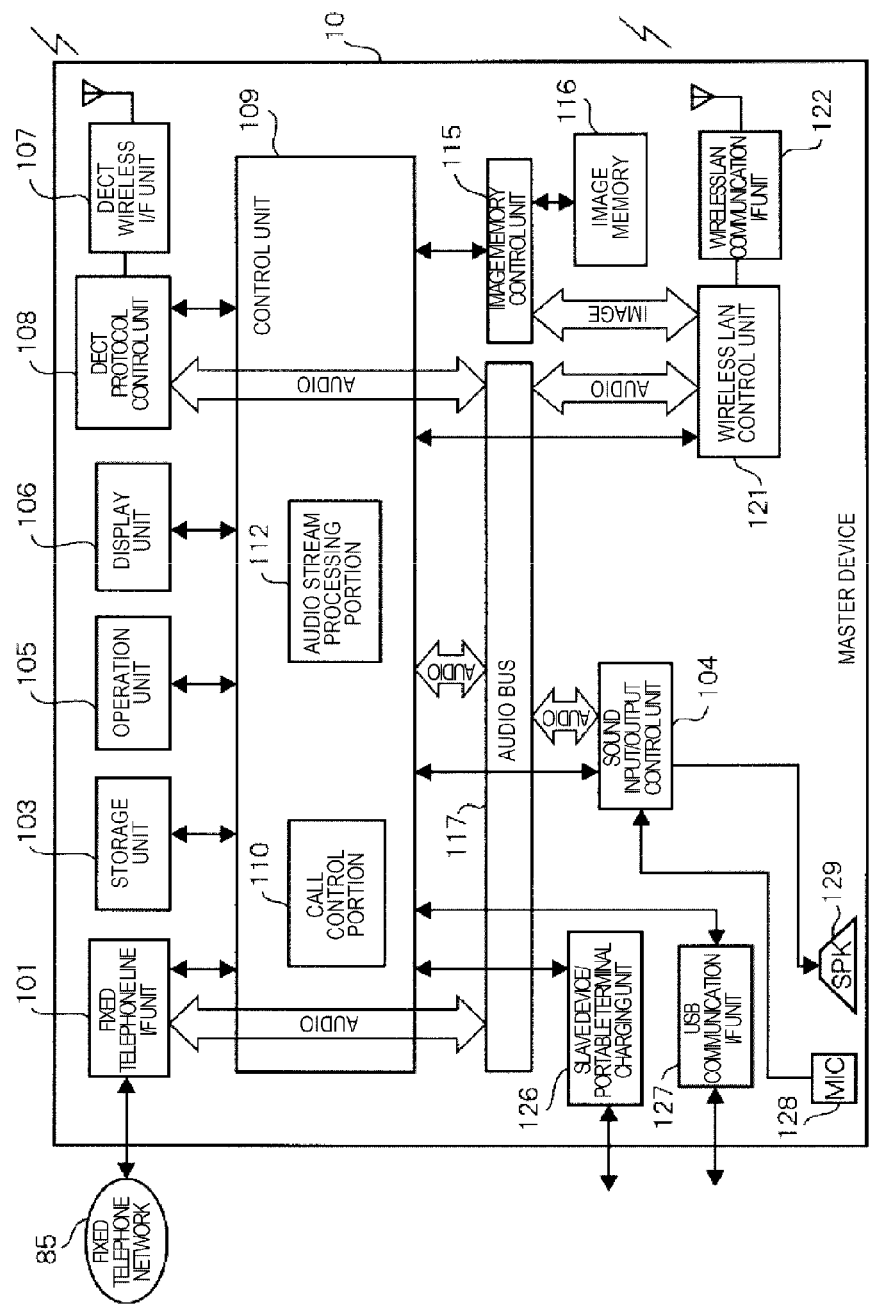
FIG. 2 is a block diagram illustrating an internal configuration of a master device.

FIG. 2 is a block diagram illustrating an internal configuration of master device 10. Master device 10 includes control unit 109, storage unit 103, operation unit 105, and display unit 106. Master device 10 receives various input operations and displays information such as an image on display unit 106. Control unit 109 has a call control portion 110 and an audio stream processing portion 112 built thereinto, and performs call control during calling, processing of audio data, and the like.

Master device 10 includes an image memory control unit 115 and image memory 116, and stores image data or the like captured by camera 30 in image memory 116.

Master device 10 includes wireless LAN control unit 121 and wireless LAN communication I/F unit 122, and transmits and receives image data and audio data to and from smartphone 50, camera 30, and the like via wireless router 60 connected over a wireless LAN.

Master device 10 includes DECT protocol control unit 108 and DECT wireless I/F unit 107, and performs wireless connection to slave device 20, sensor 40, and camera 30 by using a wireless method such as digital enhanced cordless telecommunications (DECT).

Master device 10 includes audio bus 117, sound input/output control unit 104, speaker 129, and microphone 128, and performs input and output of sound to and from an external device.

Master device 10 includes fixed telephone line I/F unit 101, and can perform a call to external fixed telephone 80 connected to fixed telephone network 85.

Master device 10 includes slave device/portable terminal charging unit 126 and charges slave device 20 or smartphone 50 inserted into insertion port 10a.

Master device 10 includes USB communication I/F unit 127, and transmits and receives data to and from an apparatus, a memory, or the like having an interface of a universal serial bus (USB) standard.

Master device 10 registers various sensors 40 (specifically, human sensors 40A and 40B, smoke sensor 40C, and opening/closing sensor 40D) and the plurality of cameras 30 in storage unit 103 in correlation with each other. For example, human sensor 40B and monitoring camera 30B are installed at close locations outdoors and are thus registered in correlation with each other. Monitoring camera 30B, as will be described later, integrally has infrared sensor 313 (refer to FIG. 4) which is a human sensor and is built thereinto, and is thus also registered in correlation with infrared sensor 313. Human sensor 40A, smoke sensor 40C, and opening/closing sensor 40D are all installed inside house 8 and are thus registered in correlation with indoor camera 30A.

Figure 3:
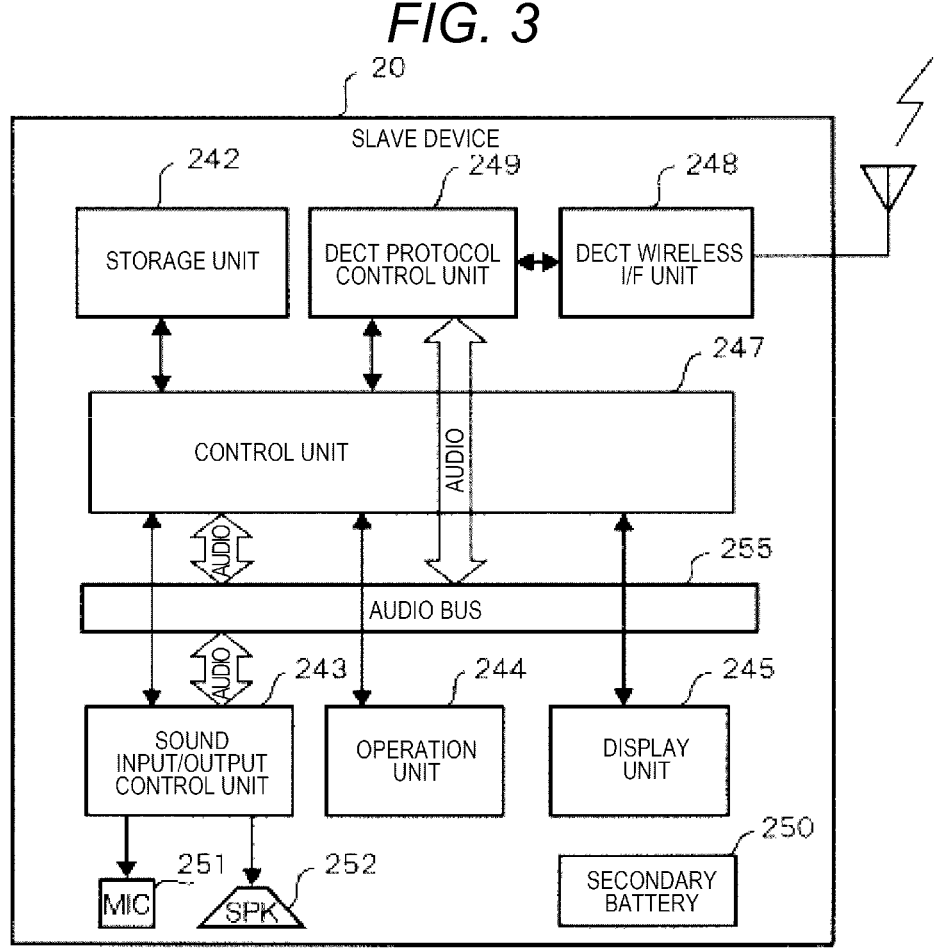
FIG. 3 is a block diagram illustrating an internal configuration of a slave device.

FIG. 3 is a block diagram illustrating an internal configuration of slave device 20. Slave device 20 includes control unit 247, storage unit 242, operation unit 244, and display unit 245. Slave device 20 receives various input operations and displays information such as an image on display unit 245.

Slave device 20 includes DECT protocol control unit 249 and DECT wireless I/F unit 248, and performs wireless connection to master device 10, sensor 40, and camera 30 by using a wireless method such as DECT.

Slave device 20 includes audio bus 255, sound input/output control unit 243, speaker 252, and microphone 251, and performs input and output of sound to and from an external device.

Figure 4:
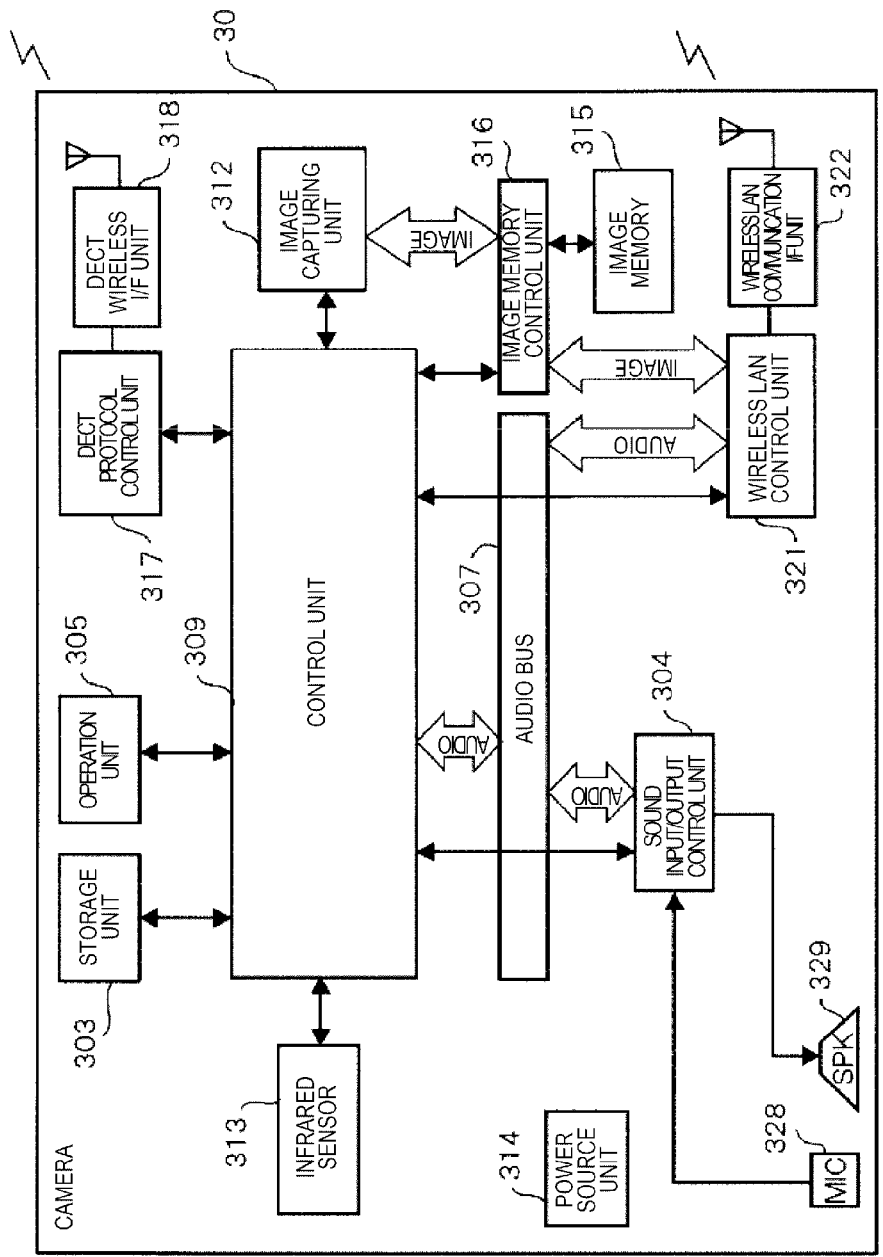
FIG. 4 is a block diagram illustrating an internal configuration of a camera.

FIG. 4 is a block diagram illustrating an internal configuration of camera 30. Indoor camera 30A and monitoring camera 30B as examples of cameras 30 have substantially the same specification as each other. Camera 30 includes control unit 309, storage unit 303, and operation unit 305. Camera 30 performs an operation related to image capturing and also receives input operations.

Camera 30 includes DECT protocol control unit 317 and DECT wireless I/F unit 318, and performs wireless connection to master device 10 by using a wireless method such as DECT.

Camera 30 includes wireless LAN control unit 321 and wireless LAN communication I/F unit 322, and transmits and receives image data and audio data to and from master device 10, smartphone 50, and the like via wireless router 60 connected over the wireless LAN.

Camera 30 includes audio bus 307, sound input/output control unit 304, speaker 329, and microphone 328, and performs input and output of sound to and from an external device.

Camera 30 includes image capturing unit 312, image memory control unit 316, and image memory 315, and stores image data captured by image capturing unit 312 in image memory 315. Image capturing unit 312 has a lens and an imaging element (for example, an image sensor such as a charged coupled device (CCD) or a complementary metal oxide semiconductor (CMOS)).

Camera 30 integrally has infrared sensor 313 which is a passive infrared (PIR) sensor as a human sensor built thereinto. Infrared sensor 313 detects the presence of a person by detecting a change in heat (infrared rays) generated by the person. Camera 30 includes power source unit 314 which is constituted by a commercial AC power source.

Figure 5:
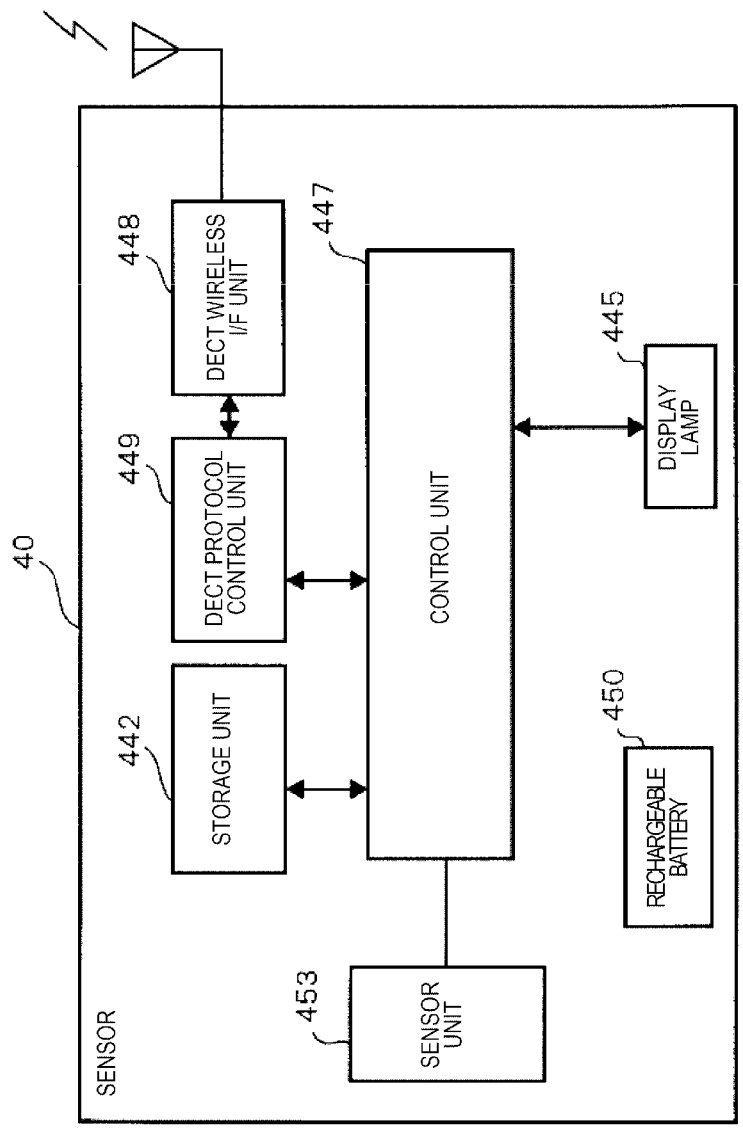
FIG. 5 is a block diagram illustrating an internal configuration of a sensor.

FIG. 5 is a block diagram illustrating an internal configuration of sensor 40. Sensor 40 includes control unit 447, storage unit 442, and display lamp 445. Sensor 40 performs a predetermined detection operation, such as turning on display lamp 445, in a case of detecting a target (for example, an intruder which is also the same for the following description).

Sensor 40 includes DECT protocol control unit 449 and DECT wireless I/F unit 448, and performs wireless connection to master device 10 by using a wireless method such as DECT, and sends sensor detection information to master device 10 when a target is detected.

Sensor unit 453 differs depending on the kind of sensor 40. For example, in a case of human sensors 40A and 40B, sensor unit 453 is a PIR sensor which detects a person through a change in infrared rays. In a case of opening/closing sensor 40D which detects opening and closing of a window or the like, sensor unit 453 is a reed switch which switches between turned-on and turned-off states due to opening and closing. In a case of smoke sensor 40C, sensor unit 453 is a light emitting/receiving unit which detects smoke when emitted light is blocked by the smoke.

Rechargeable battery 450 is a battery which can be charged and supplies power to each unit.

Figure 6:
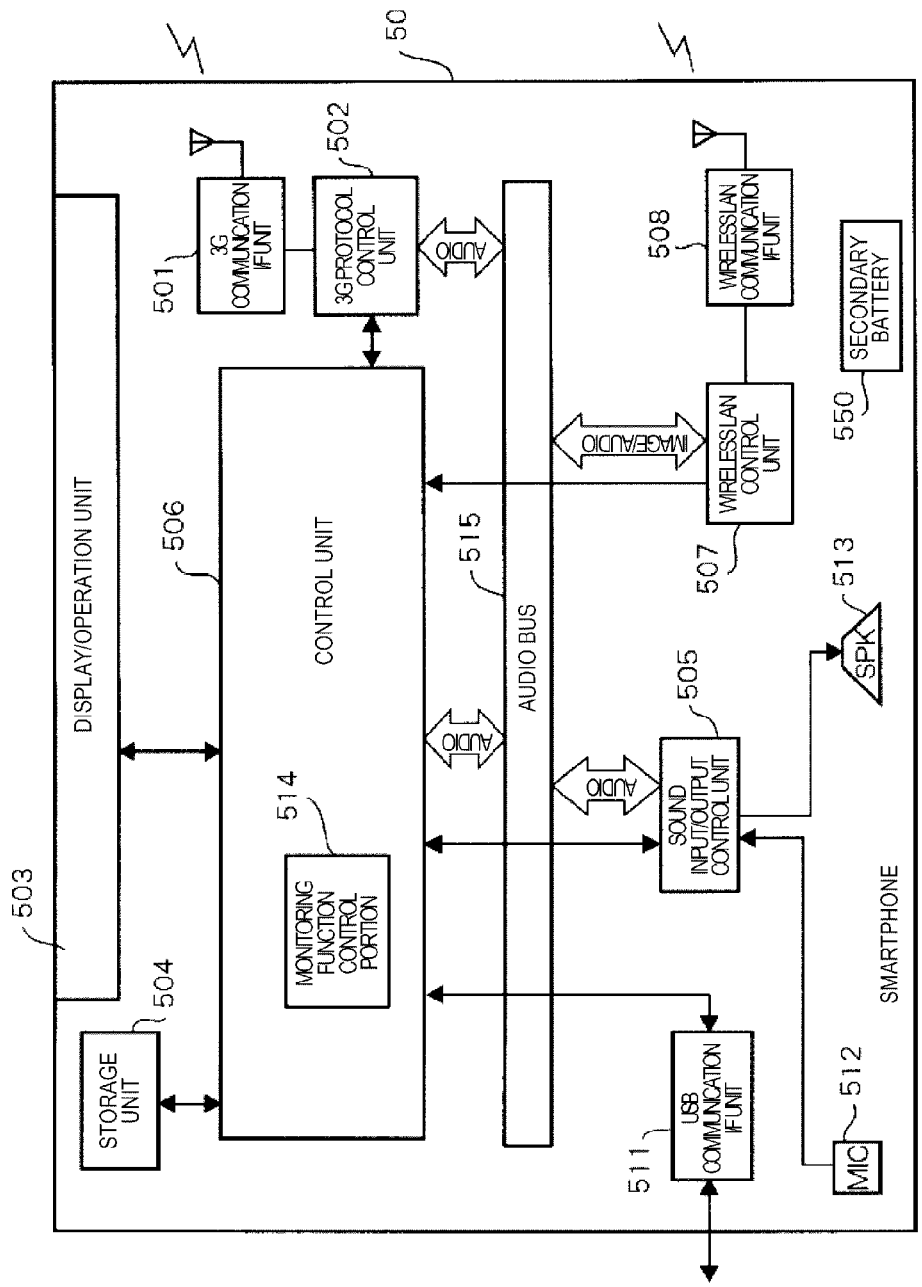
FIG. 6 is a block diagram illustrating an internal configuration of a smartphone.

FIG. 6 is a block diagram illustrating an internal configuration of smartphone 50. Smartphone 50 includes control unit 506, storage unit 504, and display/operation unit (touch panel) 503. Smartphone 50 receives various input operations and displays information such as an image on touch panel 503. Monitoring function control portion 514 which can set a function of camera 30 is built into control unit 506 as will be described later. Touch panel 503, which is a display/input unit in which a display unit and an operation unit are integrally formed, displays information such as an image or an icon on a screen and receives a tap operation (or a touch operation) which is performed on the screen by a user.

Smartphone 50 includes 3G protocol control unit 502 and 3G wireless I/F unit 501, and performs wireless connection to mobile phone 70 or other smartphones connected to mobile phone network 75, by using a third generation (3G) wireless communication method.

Smartphone 50 includes audio bus 515, sound input/output control unit 505, speaker 513, and microphone 512, and performs input and output of sound to and from an external device.

Smartphone 50 includes wireless LAN control unit 507 and wireless LAN communication I/F unit 508, and transmits and receives image data and audio data to and from master device 10, camera 30, and the like via wireless router 60 connected over the wireless LAN.

Smartphone 50 includes USB communication I/F unit 511, and transmits and receives data to and from an apparatus, memory, or the like having an interface of a universal serial bus (USB) standard.

A description will be made of an operation of monitoring camera system 5 having the above-described configuration.

First, an operation of smartphone 50 will be described. When a user activates an application of the monitoring camera installed in smartphone 50, smartphone 50 displays an initial screen.

Figure 7:
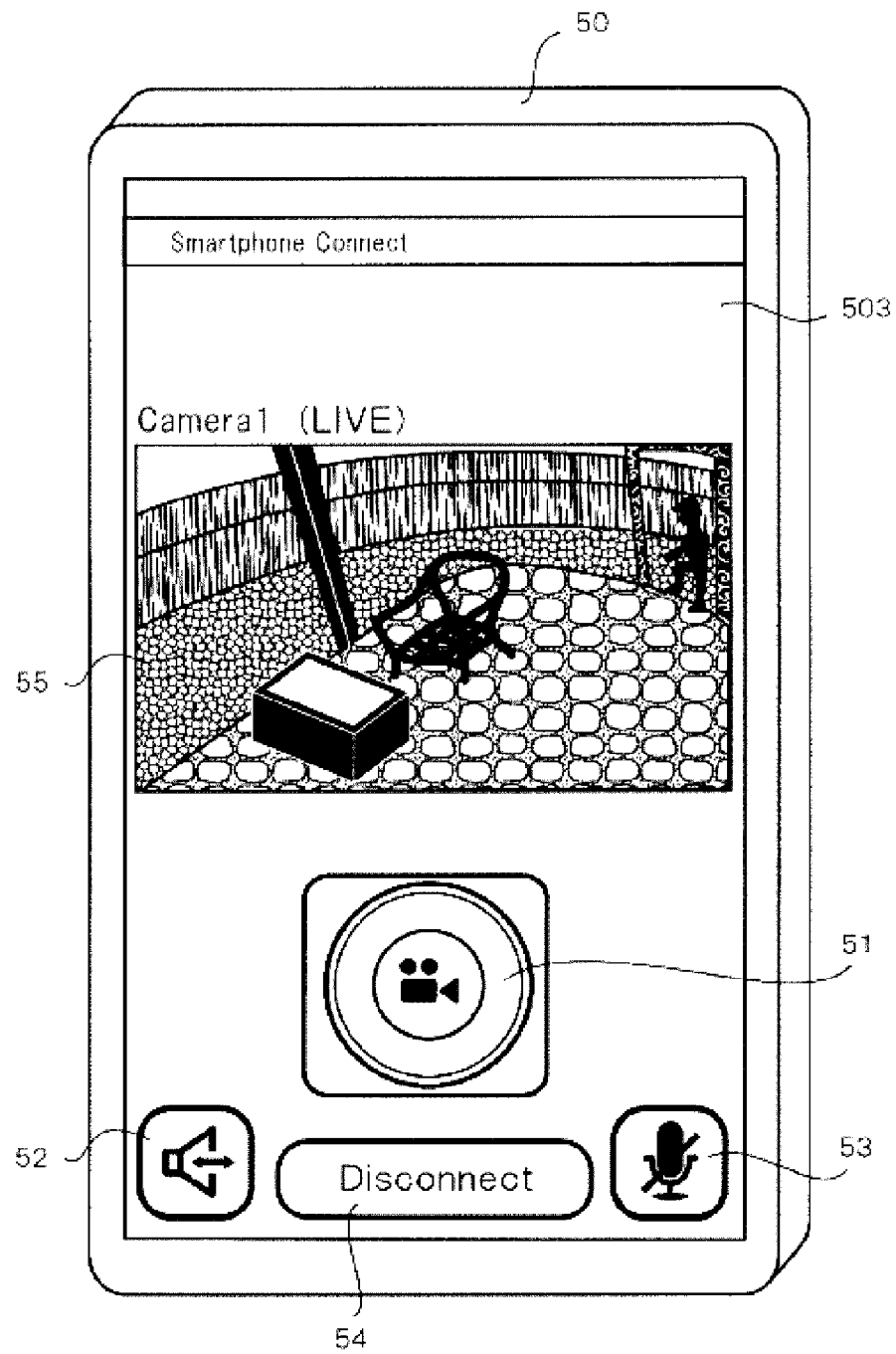
FIG. 7 is a diagram illustrating an initial screen of the smartphone during activation.

FIG. 7 is a diagram illustrating the initial screen of smartphone 50 during activation. When the application of the monitoring camera is activated, image (moving image) 55 captured by camera 30 is displayed at a center of the initial screen of touch panel 503. Camera icon 51, speaker icon 52, mute icon 53, and disconnect icon 54 are displayed on the screen of touch panel 503 so that a tap operation can be performed thereon.

Camera icon 51 is an icon used to instruct camera 30 to start video recording and to set a function of camera 30.

Speaker icon 52 as mode switching means is an icon used to switch a volume of speaker 513 mounted in smartphone 50 and is in a turned-on state during the activation. When a tap operation is performed on speaker icon 52, speaker icon 52 can switch between a turned-on state and a turned-off state. Herein, speaker icon 52 is displayed green in a turned-on state and is displayed white in a turned-off state.

The turned-on state of speaker icon 52 is a state in which the volume of speaker 513 is set to be high and is suitable for typical monitoring or a hands-free call (a speaker phone call). In other words, in a case where speaker icon 52 is in the turned-on state, a volume suitable for a hands-free call (speaker phone call) is set in smartphone 50. On the other hand, the turned-off state of speaker icon 52 is a state in which the volume of speaker 513 is set to be low as if whispered in a user's ear, and is suitable for sound monitoring or a handset call. In other words, in a case where speaker icon 52 is in the turned-off state, the volume suitable for a handset call is set in smartphone 50.

Mute icon 53 is an icon used to switch turning-on and turning-off of microphone 512 mounted in smartphone 50, and is in a turned-on state during activation, that is, in an invalid (silent) state of microphone 512. When a tap operation is performed on mute icon 53, mute icon 53 can switch between a turned-on state and a turned-off state. Herein, in the same manner as speaker icon 52, mute icon 53 is displayed green in a turned-on state and is displayed white in a turned-off state.

Disconnect icon 54 in which characters "disconnect" are written, is an icon used to disconnect camera 30 and is in a turned-off state during activation, that is, in a connection state.

Figure 8A:
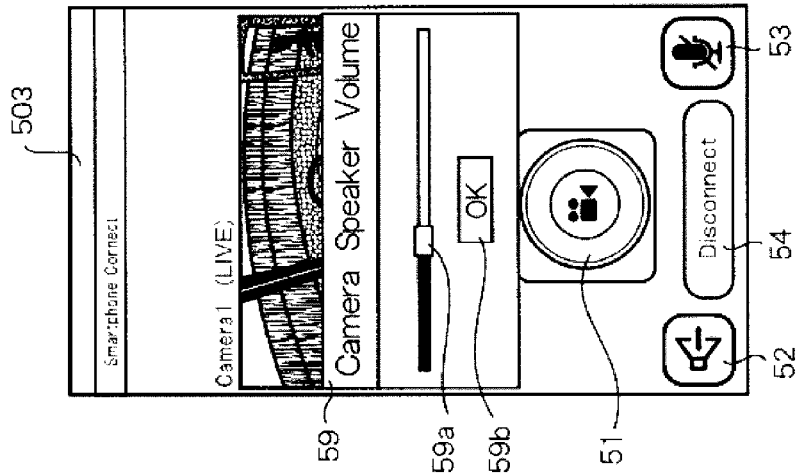
FIG. 8A is a diagram illustrating transition of a screen of the smartphone when a volume of a microphone and a speaker is set.
Figure 8B:
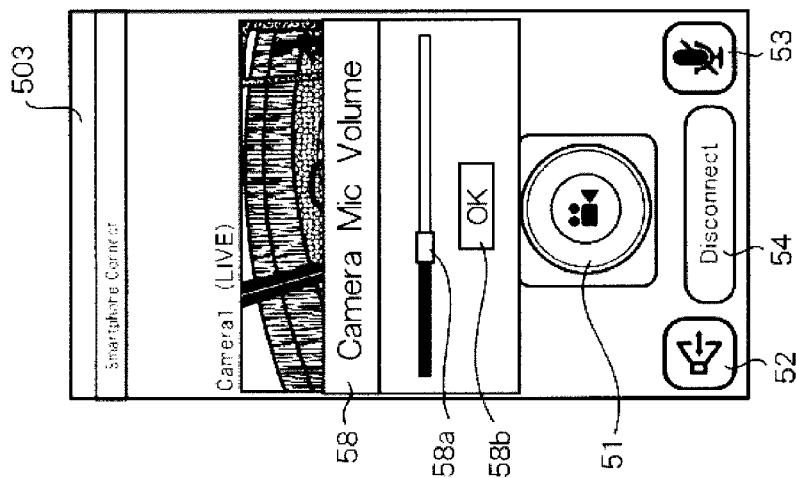
FIG. 8B is a diagram illustrating transition of the screen of the smartphone when the volume of a microphone and a speaker is set.
Figure 8C:
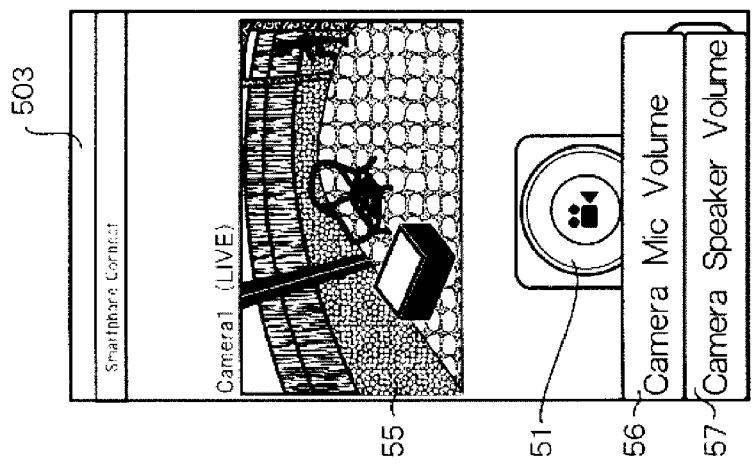
FIG. 8C is a diagram illustrating transition of the screen of the smartphone when the volume of a microphone and a speaker is set.

FIGS. 8A to 8C are diagrams illustrating transition of a screen of smartphone 50 when the volumes of microphone 328 and speaker 329 of camera 30 are set. When a predetermined operation is performed on the screen of touch panel 503, selection menus for setting the volume of microphone 328 and speaker 329 of camera 30 are displayed on the screen of touch panel 503.

As illustrated in FIG. 8A, "Camera Mic Volume" key 56 displayed as a selection menu is a key for setting the volume of microphone 328. "Camera Speaker Volume" key 57 is a key for setting the volume of speaker 329.

When a tap operation is performed on "Camera Mic Volume" key 56, as illustrated in FIG. 8B, the selection menu disappears, and then seek bar 58 is displayed on the screen of touch panel 503. When the user moves slider 58a of seek bar 58 in horizontal directions in the figure, the volume (microphone sensitivity) of microphone 328 of camera 30 is changed. If the volume of microphone 328 is determined, and OK button 58b is pressed, the determined volume of microphone 328 is set in camera 30.

Similarly, when a tap operation is performed on "Camera Speaker Volume" key 57, as illustrated in FIG. 8C, the selection menu disappears, and then seek bar 59 is displayed on the screen of touch panel 503. When the user moves slider 59a of seek bar 59 in horizontal directions in the figure, the volume of speaker 329 of camera 30 is changed. If the volume of speaker 329 is determined, and OK button 59b is pressed, the determined volume of speaker 329 is set in camera 30.

Next, a description will be made of various operation modes using smartphone 50.

In the present embodiment, smartphone 50 can be switched to four operation modes including a typical monitoring mode, a hands-free call mode, a handset call mode, and a sound monitoring mode. As described above, right after the application of the monitoring camera is activated, smartphone 50 displays the initial screen (refer to FIG. 7) and is in the typical monitoring mode. An operation of activating the application corresponds to a monitoring instruction as an operation of giving an instruction for image display. In the typical monitoring mode, sound collected by microphone 328 of camera 30 is output from speaker 513 of smartphone 50 at a high volume, and microphone 512 of smartphone 50 is in an invalid state. In other words, sound of the user is not collected by microphone 512 of smartphone 50.

FIGS. 9A to 9C are diagrams illustrating transition of a screen of smartphone 50 when a hands-free call is performed. When a tap operation is performed on mute icon 53 in the initial screen of FIG. 7, as illustrated in FIG. 9A, mute icon 53 is turned off, and guidance 61 of "Mute OFF" is displayed on the screen of touch panel 503. Then, if the switching time (here, 0.2 seconds) has elapsed, as illustrated in FIG. 9B, microphone 512 of smartphone 50 becomes valid, and the smartphone is switched to the hands-free call mode. In this hands-free call mode, sound collected by microphone 328 of monitoring camera 30B is output from speaker 513 of smartphone 50 at a high volume, and microphone 512 of smartphone 50 becomes valid so that a hands-free call can be performed to monitoring camera 30B.

In the hands-free call mode, when a tap operation is performed on mute icon 53 again, as illustrated in FIG. 9C, mute icon 53 is turned on, and guidance 62 of "Mute ON" is displayed on the screen of touch panel 503. Then, if the switching time (here, 0.2 seconds) has elapsed, the screen returns to the initial screen of FIG. 7, microphone 512 of smartphone 50 is invalidated, and the smartphone returns to the typical monitoring mode.

Figure 10A:
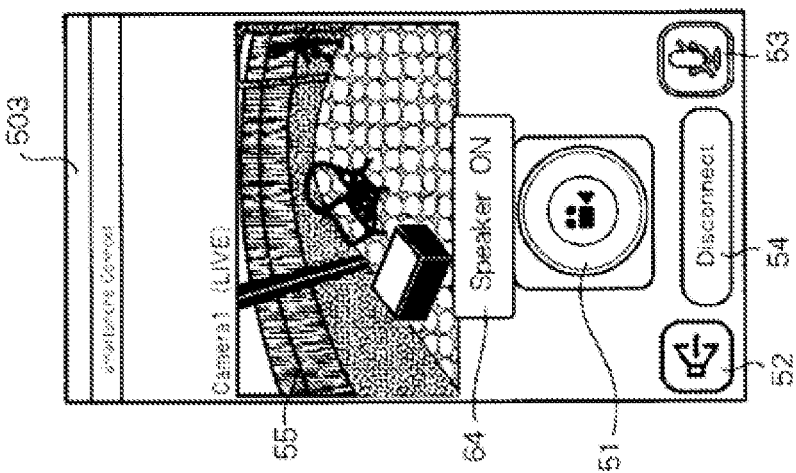
FIG. 10A is a diagram illustrating transition of the screen of the smartphone when a handset call is performed.
Figure 10B:
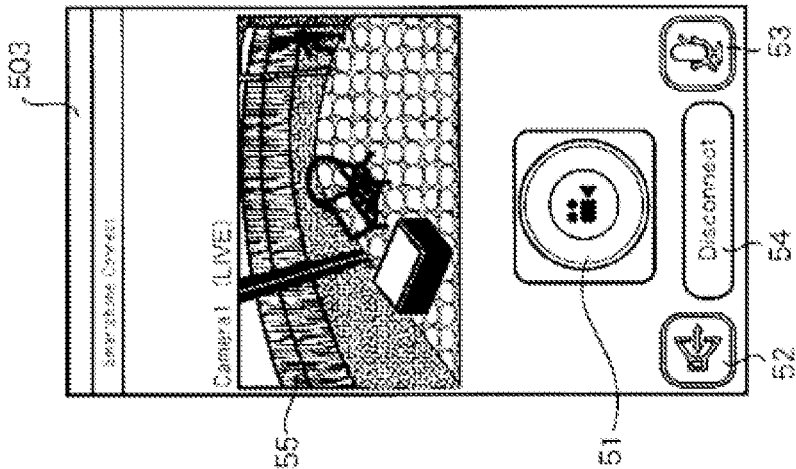
FIG. 10B is a diagram illustrating transition of the screen of the smartphone when a handset call is performed.
Figure 10C:
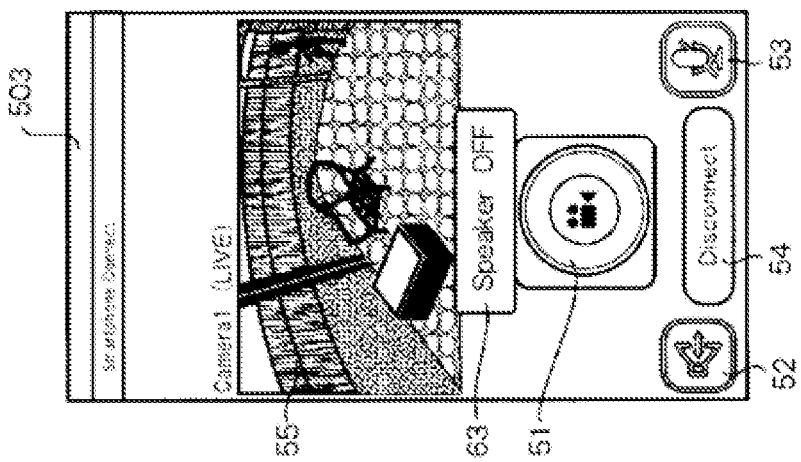
FIG. 10C is a diagram illustrating transition of the screen of the smartphone when a handset call is performed.

FIGS. 10A to 10C are diagrams illustrating transition of a screen of smartphone 50 when a handset call is performed. When a tap operation is performed on speaker icon 52 in the hands-free call mode illustrated in FIG. 9B, speaker icon 52 is turned off, and guidance 63 of "Speaker OFF" is displayed on the screen of touch panel 503, as illustrated in FIG. 10A. Then, if the switching time (here, 0.2 seconds) has elapsed, as illustrated in FIG. 10B, the smartphone is switched to the handset call mode. In the handset call mode, sound collected by microphone 328 of monitoring camera 30B is output from speaker 513 of smartphone 50 at a low volume (a volume at which the sound can be heard when speaker 513 is close to a user's ear), and microphone 512 of smartphone 50 is still valid. Smartphone 50 can perform a handset call to monitoring camera 30B.

When a tap operation is performed on speaker icon 52 in the handset call mode, as illustrated in FIG. 10C, speaker icon 52 is turned on, and guidance 64 of "Speaker ON" is displayed on the screen of touch panel 503. Then, if the switching time (here, 0.2 seconds) has elapsed, the screen returns to the screen illustrated in FIG. 9B, smartphone 50 increases the volume of speaker 513 and is switched to the hands-free call mode.

On the other hand, when a tap operation is performed on mute icon 53 in the handset call mode illustrated in FIG. 10B, mute icon 53 and speaker icon 52 are turned on, and, as illustrated in FIG. 9C, guidance 62 of "Mute ON" is displayed on the screen of touch panel 503. Then, if the switching time (here, 0.2 seconds) has elapsed, the screen returns to the initial screen of FIG. 7, microphone 512 of smartphone 50 is invalidated, and smartphone 50 returns to the typical monitoring mode.

FIGS. 11A to 11C are diagrams illustrating transition of a screen of smartphone 50 when telephone monitoring is performed. When a tap operation is performed on speaker icon 52 in the initial screen of FIG. 7, as illustrated in FIG. 11A, speaker icon 52 is turned off, and guidance 63 of "Speaker OFF" is displayed on the screen of touch panel 503. Then, if the switching time (here, 0.2 seconds) has elapsed, as illustrated in FIG. 11B, smartphone 50 reduces the volume of speaker 513 of smartphone 50 and is switched to the telephone monitoring mode. In the telephone monitoring mode, sound collected by microphone 328 of monitoring camera 30B is output from speaker 513 of smartphone 50 at a low volume (a volume at which the sound can be heard when speaker 513 is close to a user's ear), and microphone 512 of smartphone 50 is still invalid.

When a tap operation is performed on speaker icon 52 in the telephone monitoring mode, as illustrated in FIG. 11C, speaker icon 52 is turned on, and guidance 64 of "Speaker ON" is displayed on the screen of touch panel 503. Then, if the switching time (here, 0.2 seconds) has elapsed, the screen returns to the initial screen of FIG. 7, microphone 512 of smartphone 50 is invalidated, and smartphone 50 returns to the typical monitoring mode.

On the other hand, when a tap operation is performed on mute icon 53 in the telephone monitoring mode illustrated in FIG. 11B, mute icon 53 is turned off, and guidance 61 of "Mute OFF" is displayed on the screen of touch panel 503. Then, if the switching time (here, 0.2 seconds) has elapsed, as illustrated in FIG. 10B, microphone 512 of smartphone 50 becomes valid, and the smartphone is switched to the handset call mode.

Next, a description will be made of a flow of an operation of monitoring camera system 5.

FIG. 12 is a sequence diagram illustrating a flow of an operation of monitoring camera system 5. Herein, a description will be made of an operation of monitoring an intruder or the like by using human sensor 40B and monitoring camera 30B provided outdoors.

First, if human sensor 40B detects a person present outdoors, a detection signal and sensor detection information are transmitted to master device 10 (step S101). If the sensor detection information is received from human sensor 40B, master device 10 is wirelessly connected to smartphone 50 by using the wireless LAN (step S102), and transmits the sensor detection information to smartphone 50 when the connection has been completed (step S103A).

Master device 10 requests monitoring camera 30B to transmit image/audio data (step S103B). If the request for transmission of image/audio data is received, monitoring camera 30B is connected to master device 10 by using the wireless LAN, and transmits image data captured by image capturing unit 312 and audio data collected by microphone 328 to master device 10 (step S104).

If a monitoring instruction is received from the user (step S105-1), smartphone 50 requests master device 10 to transmit the image/audio data (step S105-2). In response to the request for transmission of the image/audio data from smartphone 50, master device 10 transmits the image data and the audio data which have been transmitted from monitoring camera 30B, to smartphone 50 (step S106).

Consequently, smartphone 50 displays the initial screen (refer to FIG. 7) and enters the typical monitoring mode. If a tap operation is performed on speaker icon 52 in the typical monitoring mode in which the initial screen is displayed (step S107A), smartphone 50 is switched to the sound monitoring mode (step S108).

On the other hand, if a tap operation is performed on mute icon 53 in the typical monitoring mode in which the initial screen is displayed (step S107B-1), smartphone 50 transmits the operation information to master device 10 (step S107B-2).

If the operation information is received, master device 10 requests monitoring camera 30B to perform a hands-free call (step S109). If the hands-free call request is received, monitoring camera 30B turns on speaker 329 and transmits an acknowledgement (ACK) signal to smartphone 50 via master device 10 (step S110).

If the ACK signal is received from monitoring camera 30B, smartphone 50 is switched to the hands-free call mode and starts performing a call. In other words, smartphone 50 transmits the audio data for conversation, collected by microphone 512, to master device 10 (step S111). Master device 10 transmits the received audio data for conversation to monitoring camera 30B (step S112). Monitoring camera 30B outputs the audio data for conversation received from master device 10, from speaker 329 (step S113).

Transmission of audio data for conversation from monitoring camera 30B to smartphone 50 is performed in a reverse order. In other words, monitoring camera 30B transmits audio data for conversation collected by microphone 328 to master device 10 (step S114). Master device 10 transmits the received audio data for conversation to smartphone 50 (step S115). Smartphone 50 outputs the audio data for conversation received from master device 10, from speaker 513 (step S116).

In a case where the smartphone is switched to the sound monitoring mode in step S108 and then a tap operation is performed on mute icon 53, smartphone 50 is switched to the handset call mode.

FIG. 13 is a flowchart illustrating an operation procedure of master device 10. Master device 10 starts the present operation with a detection signal from human sensor 40B as a trigger. First, master device 10 acquires sensor detection information from human sensor 40B (step S1). Master device 10 determines whether or not a request for transmission of image/audio data has been received from smartphone 50 (step S2). If the request has not been received, master device 10 finishes the present operation.

On the other hand, if the request for transmission of image/audio data has been received from smartphone 50, master device 10 transmits image data and audio data transmitted from monitoring camera 30B, to smartphone 50 (step S3).

Master device 10 determines whether or not a request for a hands-free call or a handset call is made from smartphone 50 (step S4). This call request is made by performing a tap operation on mute icon 53 as described above. If there is no request for a call from smartphone 50, master device 10 finishes the present operation.

On the other hand, if there is a call request from smartphone 50, master device 10 relays a call between smartphone 50 and monitoring camera 30B (step S5).

Subsequently, master device 10 determines whether or not an instruction for ending of the call is given from smartphone 50 (step S6). The instruction for ending of the call is given by performing a tap operation on mute icon 53 or a tap operation on disconnect icon 54 as described above. If the instruction for ending of the call is not given, master device 10 returns to the process in step S5. On the other hand, if the instruction for ending of the call is given, master device 10 finishes the present operation. Master device 10 enters a standby state until being activated with a detection signal from sensor 40 as a trigger again.

As mentioned above, in monitoring camera system 5 of the present embodiment, if human sensor 40B detects an intruder (target), sensor detection information is sent to master device 10. Master device 10 transmits the sensor detection information sent from human sensor 40B, to smartphone 50, and also sends a request for transmission of image/audio data to monitoring camera 30B which is registered in correlation with human sensor 40B. If an operation of a monitoring instruction is received, smartphone 50 sends the operation information to master device 10. Master device 10 sends the image data transmitted from monitoring camera 30B, to smartphone 50, according to the operation information. Smartphone 50 displays the image data sent from monitoring camera 30B on touch panel 503, and sends a request signal for starting a call to monitoring camera 30B when receiving a tap operation on mute icon 53. Master device 10 transmits the request signal for starting a call from smartphone 50, to monitoring camera 30B. A call between smartphone 50 and monitoring camera 30B is started.

According to monitoring camera system 5, in a case where an intruder is detected by human sensor 40B, a call between monitoring camera 30B and smartphone 50 can be performed, and thus it is possible to improve convenience. Consequently, a home dweller can converse with the intruder, such as directly listening to what is wanted from the intruder.

In a case where speaker icon 52 is turned on, and a high volume suitable for a hands-free call is set, smartphone 50 is switched to a hands-free call mode when receiving a tap operation on mute icon 53. Smartphone 50 and monitoring camera 30B enter a voice call state. Consequently, switching to a hands-free call can be easily performed.

In a case where speaker icon 52 is turned off and a low volume (a volume at which sound can be heard when speaker 513 is close to a user's ear) suitable for a handset call is set, smartphone 50 is switched to a handset call mode when receiving a tap operation on mute icon 53. Smartphone 50 and monitoring camera 30B enter a voice call state. Consequently, switching to a handset call can be easily performed.

As sensor 40, human sensor 40B may be built into a single casing integrally with monitoring camera 30B. Infrared sensor 313 which is integrally built into monitoring camera 30B may be used as a human sensor. Consequently, a camera and a sensor are easily correlated with each other.

Although the various embodiments have been described with reference to the drawings, needless to say, the present invention is not limited to such embodiments. It is obvious that a person skilled in the art can conceive of various modifications or alterations within the scope recited in the claims, and thus it is understood that they naturally fall within the technical scope of the present invention.

For example, in the above-described present embodiment, a description has been made of a case where the present invention is applied to a monitoring camera system, but the present invention is not limited thereto and is applicable to, for example, a communication system in which a traveler who possesses a camera converses with a friend or the like who possesses a portable terminal while viewing an image captured on a journey or the like.

What is claimed is:

1. A monitoring system comprising:
   a sensor;
   a monitoring camera that includes an image capturing unit, and has a call function;
   a master device that communicates with the monitoring camera, and is connected to a fixed telephone network so as to perform calls to other fixed telephones; and
   a mobile phone terminal that includes a display/input unit, performs wireless communication with the master device, and is connected to other mobile phones via a mobile phone network,
   wherein, when the sensor detects a person, a detection signal is sent to the master device,
   wherein the master device sends a signal for instructing the monitoring camera registered in correlation with the sensor to transmit image data,
   wherein, when an operation of giving an instruction for displaying an image is received, the mobile phone terminal sends information regarding the operation to the master device,
   wherein the master device sends the image data which is transmitted from the monitoring camera, to the mobile phone terminal according to the information regarding the operation,
   wherein the mobile phone terminal sends a request signal for starting a call to the monitoring camera when receiving an operation on a predetermined icon displayed on the display/input unit in a state in which the image data sent from the monitoring camera is displayed on the display/input unit, and
   wherein the master device transmits the request signal for starting a call from the mobile phone terminal, to the monitoring camera.

2. The monitoring system of claim 1,
   wherein, in a case where a volume suitable for a hands-free call is set, when an operation on the predetermined icon is received, the mobile phone terminal is switched to a hands-free call mode, and
   wherein the mobile phone terminal and the monitoring camera enter a voice call state.

3. The monitoring system of claim 1,
   wherein, in a case where a volume suitable for a handset call is set, when an operation on the predetermined icon is received, the mobile phone terminal is switched to a handset call mode, and
   wherein the mobile phone terminal and the outdoor monitoring camera enter a voice call state.

4. The monitoring system of claim 1,
   wherein the sensor is a human sensor which is integrally formed with the monitoring camera.

5. The monitoring system of claim 1,
   wherein the mobile phone terminal includes mode switching means for changing a setting so that a volume suitable for a hands-free call or a volume suitable for a handset call is obtained.

6. The monitoring system of claim 1,
   wherein the master device transmits the request signal for starting a call from the mobile phone terminal, to the monitoring camera so that a call is performed between the monitoring camera and the mobile phone terminal, and
   wherein the mobile phone terminal changes a volume of a microphone and a speaker of the monitoring camera when a predetermined operation is performed on the display/input unit.

7. The monitoring system of claim 2,
   wherein, in a case where a volume suitable for a handset call is set, when an operation on the predetermined icon is received, the mobile phone terminal is switched to a handset call mode, and
   wherein the mobile phone terminal and the outdoor monitoring camera enter a voice call state.

* * * * *